United States Patent [19]

Santoro

[11] 4,306,673

[45] Dec. 22, 1981

[54] TAPE TRANSPORT MEANS FOR CASSETTE TAPE RECORDER

[76] Inventor: Giovanni Santoro, Via Campo di Mele 55, Rome, Italy

[21] Appl. No.: 113,402

[22] Filed: Jan. 18, 1980

[30] Foreign Application Priority Data

Jan. 23, 1979 [IT] Italy ................................ 47750 A/79

[51] Int. Cl.³ ............................................ B65H 17/22
[52] U.S. Cl. .................................... 226/183; 226/190; 242/76
[58] Field of Search ................................ 226/181–183, 226/196, 190; 242/197–200, 76, 190

[56] References Cited

U.S. PATENT DOCUMENTS

| | | | |
|---|---|---|---|
| 2,624,574 | 1/1953 | Camras | 226/183 X |
| 3,219,246 | 11/1965 | Kihara | 226/181 |
| 3,690,535 | 9/1972 | Nakamichi | 226/190 |
| 3,734,373 | 5/1973 | Dattilo | 226/196 |
| 3,744,696 | 7/1973 | Warren | 226/181 |

*Primary Examiner*—Leonard D. Christian
*Attorney, Agent, or Firm*—DeLio and Montgomery

[57] ABSTRACT

A cassette tape recorder drive mechanism including a capstan and an associated pinch roller, a first tape guide means causing the tape to be partially wound on the capstan and a second tape guide means adjacent the first guide means mounted on the axis of the pinch roller for selective engagement with the capstan to vertically restrict movement of the tape in contact with the capstan regardless of the direction of tape movement.

1 Claim, 9 Drawing Figures

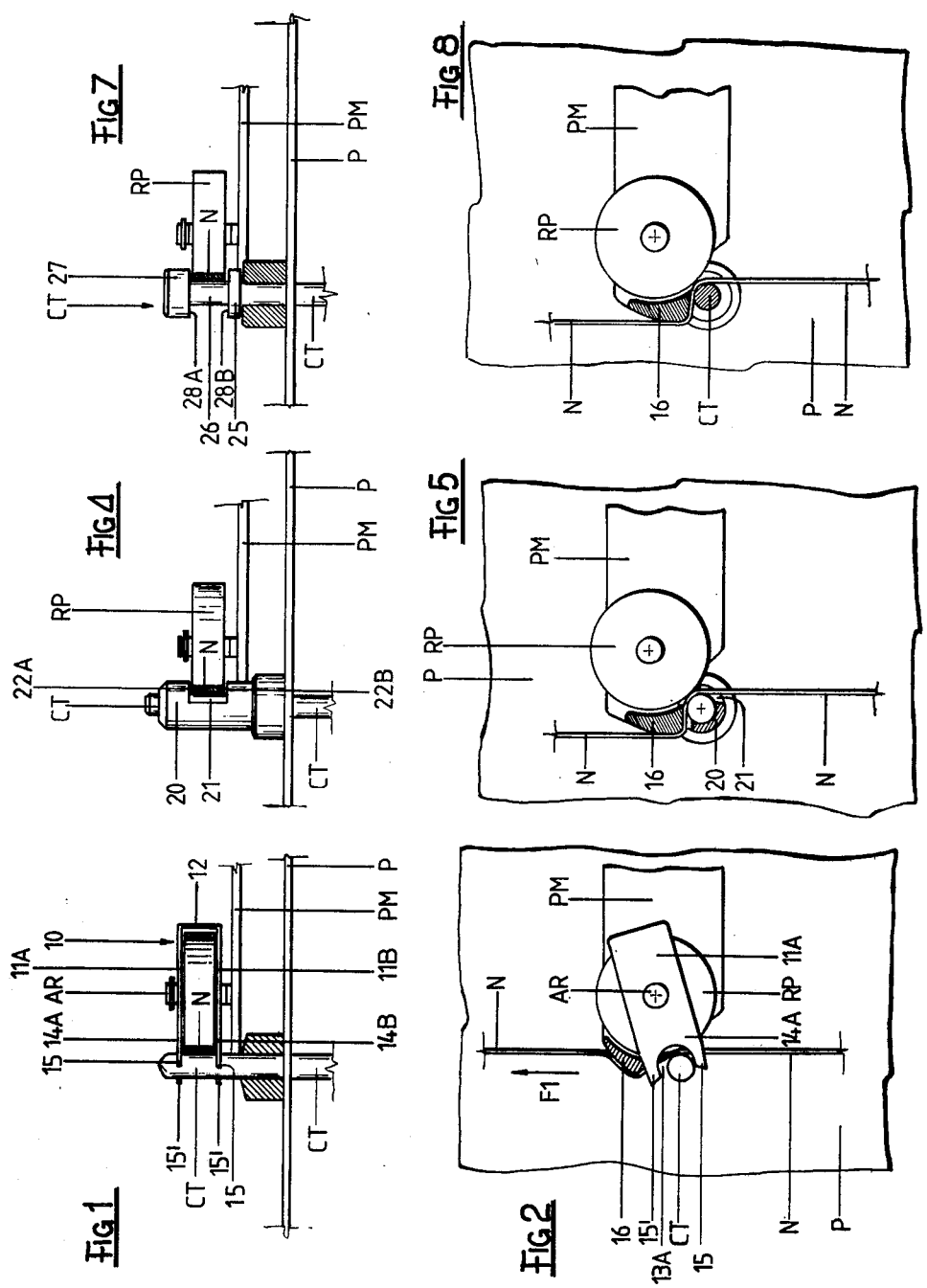

TAPE TRANSPORT MEANS FOR CASSETTE TAPE RECORDER

The invention refers generally to cassette tape recorders and, more particularly, to improvements in tape transport means especially, but not exclusively, intended for tape recorders provided with reverse operation and making use of a single capstan-pinch roller unit.

The tape drive or movement in traditional tape recorders creates a plurality of problems and these problems are even more in number and more serious in tape recorders with reverse operation.

One of these problems is that the tape has a tendency to be released from the gripping action exerted thereon by the capstan and the pinch roller cooperating therewith, thus slipping either upwardly or downwardly off its normal path.

In some recorders of the prior art an attempt has been made to eliminate this drawback making use of a suitable drive means preventing the tape from slipping either upwardly or downwardly off its correct path. This drive means is placed either upstream or downstream of the capstan-pinch roller transport unit, but it is not completely satisfactory as, particularly in tape recorders provided also with reverse operation, it works properly when the tape moves in one of the two possible directions, but disturbs the proper and smooth movement thereof when the tape moves in the other direction.

In view of the foregoing it has been found that the either negative or positive action exerted by the drive means on the tape depends on the proximity of its position to the transport unit, in respect of the direction of movement of the tape. More particularly, the driving action is satisfactory only if the guide means upstream of the transport unit is closer than the guide means downstream thereof, considering of course the direction of movement of the tape.

As a matter of fact, this involves the need of providing the tape recorders, according to the previous art provided with reverse operation, with a movable guide means which would make the structure of the recorder more complex thus increasing the costs involved.

On the contrary, this invention provides a tape guide means which is exactly placed on the tape transport unit and, accordingly, satisfies the above mentioned condition without the need of making use of a movable tape guide means.

Accordingly, it is an object of the invention to provide a drive means adaped to vertically guide the path of the moving tape, which drive means is exactly placed on the tape transport unit comprising the capstan and the pinch roller associated thereto.

According to the invention, the means vertically guiding the tape is placed on the drive unit and, more particularly, this guide means is adapted to guide the length of tape engaged with the cylindrical surface of the capstan.

The invention will be now described in detail with reference to the annexed drawings showing three possible embodiments thereof.

In the drawings:

FIG. 1 is a fragmentary elevational side view, partially cut away showing the first embodiment of the guide means according to the invention;

FIG. 2 is a fragmentary top view of the guide means of FIG. 1;

FIG. 4 is an elevational view similar to that of FIG. 1, showing a second embodiment of the guide means according to the invention;

FIG. 5 is a top view of the drive means of FIG. 4;

FIG. 7 is an elevational view similar to that of FIG. 1, showing a third embodiment of the invention;

FIG. 8 is a top view of the guide means of FIG. 7; and,

Figure 3:
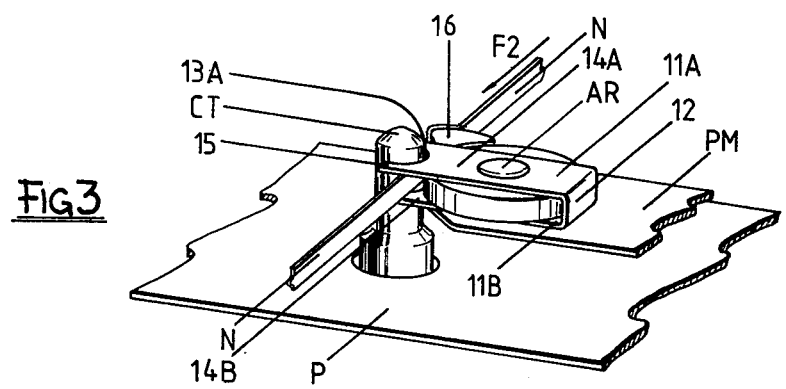
FIG. 3 is a perspective view of the same guide means.

Reference is firstly made of FIGS. 1 to 3, wherein the cassette tape recorder comprising the improved guide means according to the invention is practically omitted since only plate P, capstan CT pivotally mounted thereon, movable plate PM and pinch roller RP freely rotating on plate PM are fragmentarily illustrated therein.

In these figures the means vertically guiding tape N comprises member 10 having a U-shaped longitudinal section, arms 11A and 11B of the U being joined to each other by a vertical wall 12 and each comprising an elongated tab having an open semicircular notch 13A, 13B on front end 14A, 14B, respectively.

Moreover, each arm 11A, 11B is provided with a correspondingly positioned circular hole having such a diameter as to receive the axis of rotation AR of pinch roller RP.

In use, member 10 is horizontally mounted on axis of rotation AR of pinch roller RP, axis AR being vertically received into the corresponding holes on arms 11A, 11B, while pinch roller RP is positioned between overlying arms 11A and 11B.

Furthermore the length of arms 11A and 11B is such that, when member 10 is mounted in place, as shown in FIG. 2, and pinch roller RP exerts a pressure against capstan CT, the latter is received within vertically aligned notches 13A, 13B that have a slightly larger diameter than capstan CT.

Finally, the distance between arms 11A and 11B is slightly higher than the width of tape N, so that the tape can unfrictionally move therebetween.

It should be understood that pinch roller RP should have a thickness permitting it to freely rotate within guide member 10. Furthermore, member 10 is supported on axis AR and in respect of movable plate PM, by means of washers and shims 18 and 19, so as to freely rotate on axis AR.

In use, when tape N moves in the direction of arrow F1 and, accordingly, pinch roller RP rotates clockwise (FIG. 2), the friction exerted thereby on member 10 causes the latter to rotate in the same direction, thus bringing tips 15 of ends 14 (A, B) to bear against capstan CT, moving opposite tips 15' away therefrom.

Conversely, the movement of tape N in the direction of arrow F2 and the corresponding anticlockwise rotation of pinch roller RP (FIG. 3), causes member 10 to move in the same direction, thus bringing tips 15' of ends 14 (A, B) to bear against capstan CT, moving tips 15 away therefrom.

The presence of stationary guide 16 should be noted, which guide is located laterally of the transport unit comprising pinch roller RP and capstan CT and modifies accordingly the path followed by the moving tape increasing the area of contact between tape N and capstan CT, resulting in a better drive and trasport action.

In view of the foregoing, it will be evident that member 10 as described and illustrated above has the necessary characteristics to guide the tape satisfactorily and without drawbacks in a cassette tape recorder provided with reverse operation.

Figure 6:
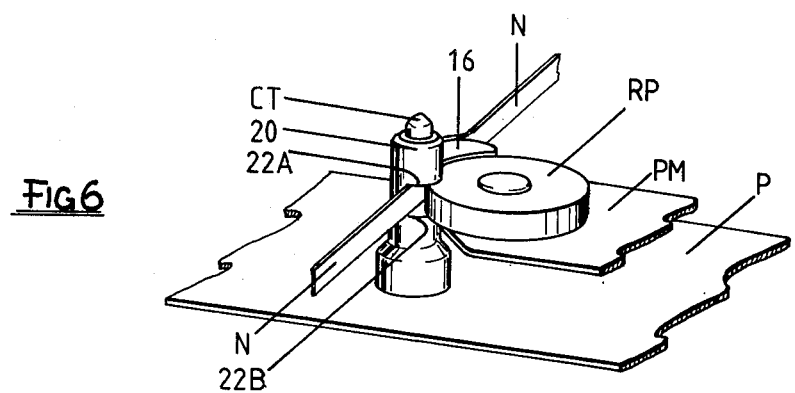
FIG. 6 is a perspective view of the same drive means.

FIGS. 4 to 6 show a second embodiment of the guide means according to the invention.

In this embodiment the guide means is placed on capstan CT instead of being placed on the pinch roller. More particularly, the guide means comprises a sleeve 20 fixedly mounted on plate P, coaxially placed around capstan CT and spaced therefrom in order to allow free rotation thereof. Sleeve 20 is provided with a window 21 having a height equal to the tape width and an angular width of about 150 degrees.

When movable plate PM causes pinch roller RP, the thickness of which is slightly smaller than the tape width, to engage capstan CT, tape N will move within window 21. Accordingly, the upper and lower edges of window 21, indicated by 22A and 22B, respectively, form a vertical guide for the tape which prevents any vertical movements thereof.

In this embodiment, the guide means is in the above mentioned best conditions for both directions of movement of the tape, being placed exactly on the capstan.

Figure 9:
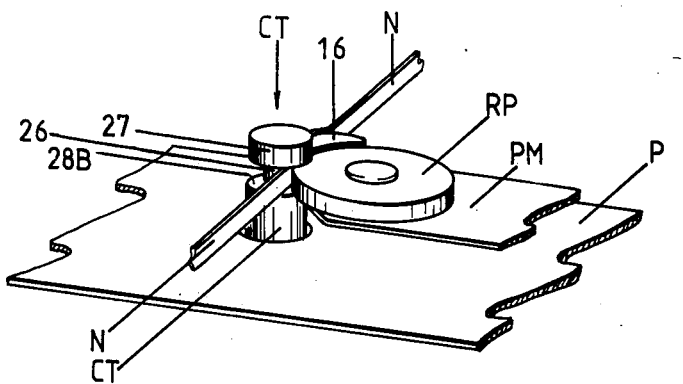
FIG. 9 is a perspective view of the same guide means.

The same is true for the embodiment of FIGS. 7 to 9, wherein the tape guide means is integrally formed with capstan CT.

In this embodiment capstan CT is stepped, having an intermediate portion 26 of normal diameter and a lower portion 25 and an upper portion or head 27 of larger diameter.

Intermediate portion 26 has a length equal to the width of tape N while pinch roller RP has an axial dimension slightly smaller than the tape width.

When movable plate PM causes pinch roller RP to engage capstan CT, and more particularly intermediate portion 26 thereof, any vertical movements of tape N therebetween are prevented both upwardly and downwardly by annular face 28A of head 27 and annular face 28B of lower portion 25, respectively.

Also in this case, the guide means is in the above mentioned best conditions for both directions of movement of the tape, being placed exactly on capstan CT.

Also in the two embodiments of FIGS. 4 to 6 and 7 to 9 a tape guide is used which modifies the path followed by moving tape N in the same way as guide 16, the guides being indicated by the same reference number 16 in all the figures.

It should be understood that the particular features of the guides formed by upper and lower edges 22A and 22B and upper and lower annular faces 28A and 28B of the embodiments of FIGS. 4 to 6 and 7 to 9 respectively, namely to be exactly placed on the capstan without moving in respect thereto, can also be obtained in the embodiment of FIGS. 1 to 3.

To this purpose, it will be sufficient to provide notches 13A and 13B on ends 14 (A, B) of arms 11 (A, B) of member 10 of a width equal to the diameter of the capstan so that the latter is "embraced" by the corresponding notch.

It should be now noted the action of guides 16 which modify the path followed by moving tape N in each of the illustrated embodiments.

These guides modifying the path as stated cause the tape to be partially wound on the capstan, thus following the contour thereof along a portion of a given angular width. This is intended both to optimize the action of the drive means according to the invention and to "stiffen" the tape in order to prevent any vertical movements thereof.

From the foregoing it will be evident that the invention fully reaches the above mentioned objects.

It is intended that changes and modifications can be made to the embodiments illustrated and described above without departing from the scope and concepts of the invention.

I claim:

1. In a cassette tape recorder provided with reverse operation comprising a means adapted to cause the tape to move in one or the other direction past the magnetic head equipping said recorder and, particularly, a single transport unit adapted to move said tape in either possible direction, said transport unit comprising a capstan driven by the motor of said recorder and supported by a stationary bottom plate and a pinch roller supported idle on an axis integral with a plate movable in respect of said capstan from a first position wherein said pinch roller is remote from said capstan to a second position wherein said pinch roller is pressed against said rotating capstan, so as to grip said tape therebetween thus driving the same, the improvements comprising a first tape guide means adapted to cause said tape to be partially wound on said capstan in a wide loop and a second tape guide means adapted to vertically guide said tape preventing any vertical movements thereof, said first guide means being placed laterally of said transport unit and said second guide means being adjacent to said first guide means, wherein said second guide means exerts its action on said tape by engagement of the upper and lower edges thereof to define a short guided length of said tape essentially corresponding to the length of tape partially wound on said capstan, said second guide means comprising a U-shaped member horizontally mounted on the axis of said pinch roller, said member comprising two parallel arms spaced from each other by a distance equal to the width of said tape and being so arranged as to receive said pinch roller therebetween, the ends of said arms protruding beyond the periphery of said pinch roller and each having a substantially semicircular notch forming two separate tips on each of said ends, said capstan being received with said notches when said pinch roller is in said second position, with said two tips of each of said two arms protruding therefrom on both sides of said capstan at points that substantially correspond to the ends of said loop formed by said first drive means on said tape between said arms.

* * * * *

UNITED STATES PATENT AND TRADEMARK OFFICE
CERTIFICATE OF CORRECTION

PATENT NO. : 4,306,673
DATED : December 22, 1981
INVENTOR(S) : Giovanni Santoro

It is certified that error appears in the above—identified patent and that said Letters Patent is hereby corrected as shown below:

Column 1, lines 51-52, delete "drive and insert --guide--.

Column 2, lines 5-6, delete "drive" and insert --guide--.

Signed and Sealed this

Twentieth Day of April 1982

|SEAL|

Attest:

GERALD J. MOSSINGHOFF

Attesting Officer — Commissioner of Patents and Trademarks